Figure 1:
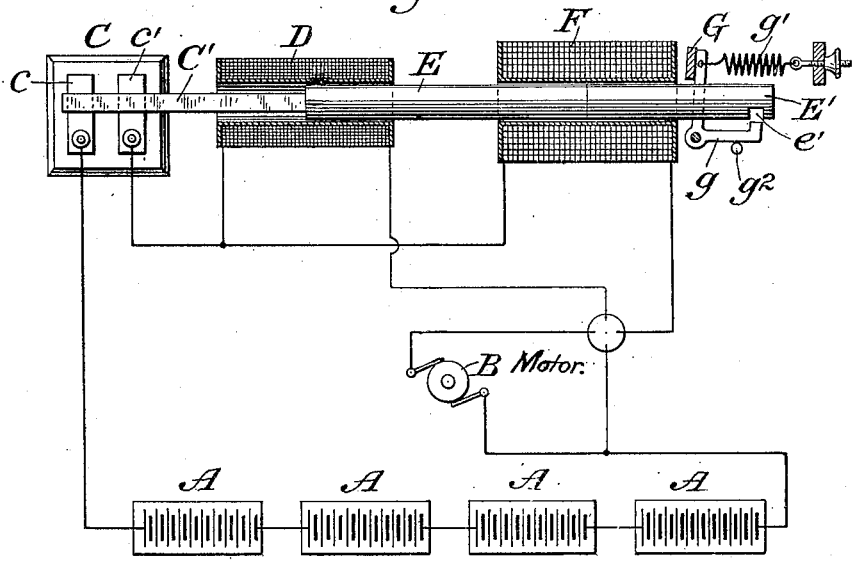

No. 653,685. Patented July 17, 1900.
H. P. MAXIM.
ELECTRIC CUT-OUT.
(Application filed Jan. 20, 1899.)
(No Model.) 2 Sheets—Sheet 1.

Attest:
A. N. Jesbera.
F. W. Eggleston.

Inventor:
Hiram Percy Maxim
by Redding, Kiddle & Greeley
Attys.

UNITED STATES PATENT OFFICE.

HIRAM PERCY MAXIM, OF HARTFORD, CONNECTICUT, ASSIGNOR, BY MESNE ASSIGNMENTS, TO THE COLUMBIA AND ELECTRIC VEHICLE COMPANY, OF JERSEY CITY, NEW JERSEY.

ELECTRIC CUT-OUT.

SPECIFICATION forming part of Letters Patent No. 653,685, dated July 17, 1900.

Application filed January 20, 1899. Serial No. 702,811. (No model.)

*To all whom it may concern:*

Be it known that I, HIRAM PERCY MAXIM, a citizen of the United States, residing in the city and county of Hartford, State of Connecticut, have invented certain new and useful Improvements in Electric Cut-Outs, of which the following is a specification, reference being had to the accompanying drawings, forming a part hereof.

The practical use of storage batteries has developed the fact that they can be used with safety under varying conditions of load until the potential or voltage falls permanently below a certain point and that further exhaustion of the batteries beyond this point occasions rapid deterioration of the batteries by reason of the destruction of the plates, so that they are thereafter incapable of being recharged to the full amount which was before possible. When such batteries are under the constant supervision of experts, they can be disconnected before the exhaustion is carried to the danger-point; but when they are not subject to such supervision, but are under the control of non-experts, as is the case when storage batteries are employed to supply the motive power of motor-vehicles intended for private use, it frequently happens that the batteries are exhausted beyond the danger or minimum point, thereby entailing much inconvenience and expense in the substitution of new batteries.

It is the object of this invention to provide for the automatic disconnection or cutting out of such batteries whenever the potential or voltage reaches a predetermined minimum.

While the invention has been made with special reference to the conditions incident to the use of storage batteries, it will nevertheless be evident that it is equally applicable to other sources of electromotive force. The practical use of storage batteries also proves that the potential may be reduced temporarily below the danger-point or predetermined minimum without injury to the batteries, as when a heavy load is temporarily put upon the batteries in the case of a motor-vehicle mounting a steep grade, and it therefore becomes desirable to provide that the batteries shall be cut out only when the potential is permanently reduced and not when it is only temporarily reduced. This requirement of service is also met.

It will be evident, particularly as the nature of the invention is more fully described hereinafter, that the invention is capable of embodiment in various forms and arrangements of electrical and mechanical devices; but the several arrangements chosen for illustration in the accompanying drawings and more fully described hereinafter will make it possible to understand the nature and characteristics of the invention and its mode of operation without illustration or description of other forms and arrangements which accomplish the same purpose.

Figure 2:
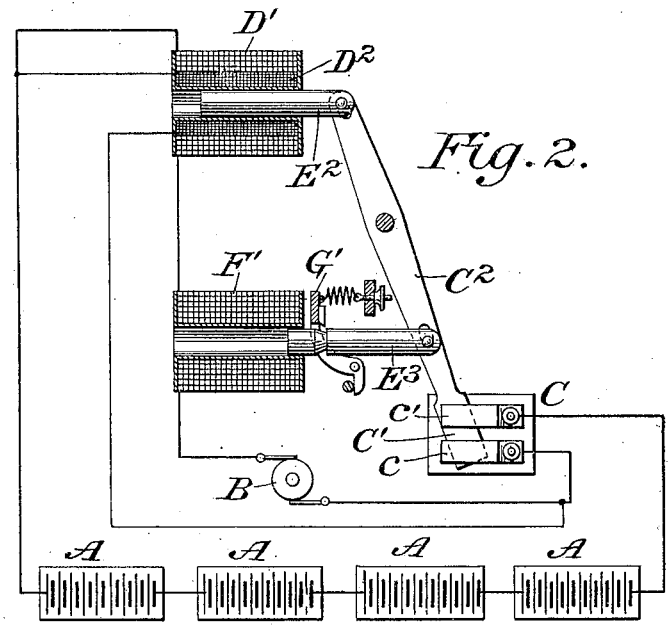
Figure 3:
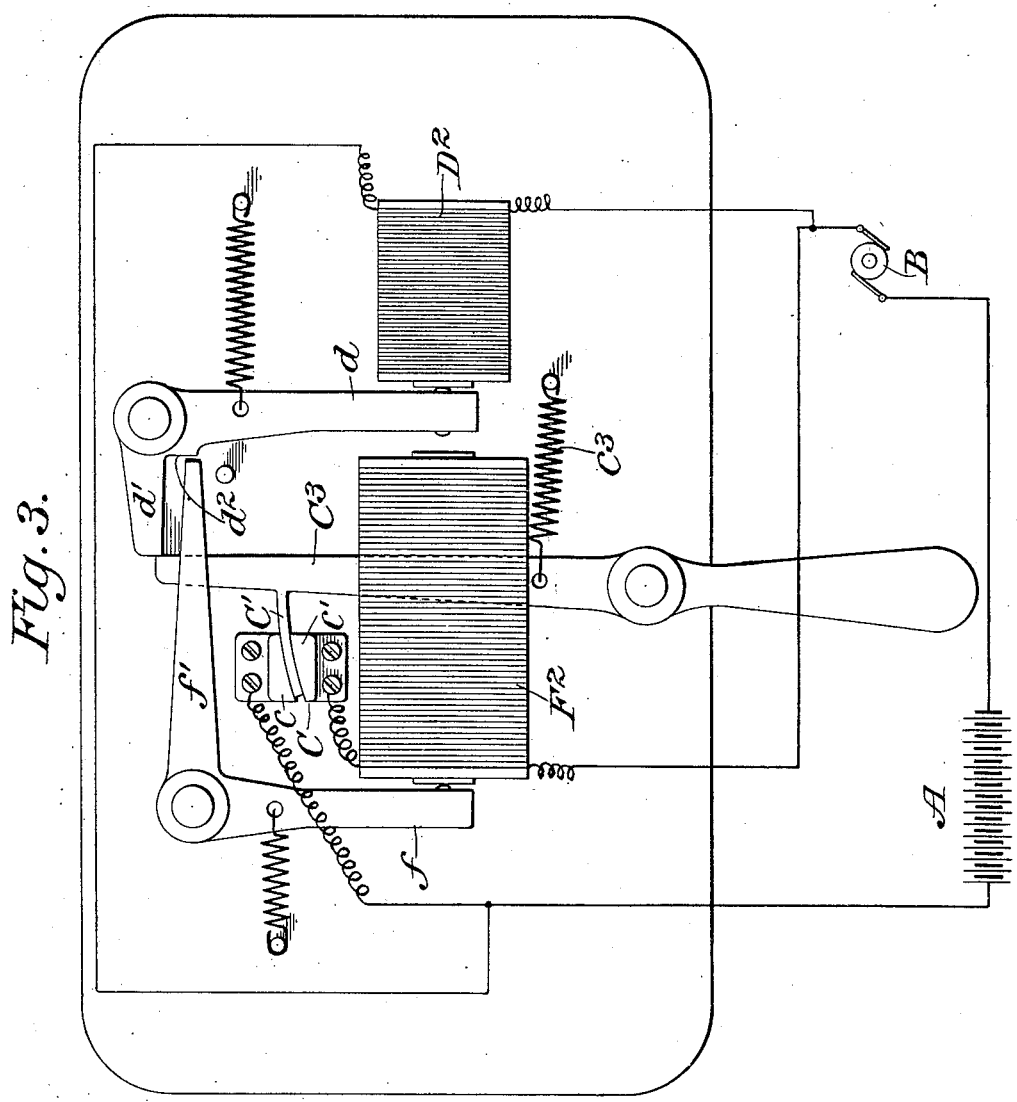

In the drawings, Figure 1 is a diagrammatic and partly-sectional view representing one embodiment of the invention as applied in connection with a storage battery and a motor. Figs. 2 and 3 are similar views of different arrangements.

In the arrangement represented in Fig. 1 the battery or other source of electromotive force (indicated at A as composed of several cells or boxes) is represented as connected in circuit with a motor B through a switch or cut-out C. The latter may be of any ordinary or preferred form and is shown as comprising two terminals $c$ and $c'$ and a finger or bridge-piece C', which is movable to open the switch or cut-out. This particular arrangement of the switch or cut-out is shown merely for convenience, and any other suitable arrangement may be substituted. The switch or cut-out is under the control of a device which is operated or the operation of which is determined by the potential of the current passing through the same. Any suitable form of electrically-operated device may be employed; but, as shown in Figs. 1 and 2, it consists of a solenoid D, which is so wound as to respond to differences in potential of the current which passes through it. As here shown, it is shunt-wound with small wire, and its core E is mechanically connected with the movable member of the switch or cut-out. The tendency of this device is to move the core, and therefore the movable member of the switch or cut-out, in a direction to keep the switch or cut-out closed; but the said movable member of the said switch or cut-out is acted upon at the same time by means which tend to move it in the opposite direction to open the switch, the force of such means, however, being such that it is unable to overcome the force of the controller D so long as the voltage of potential of the current flowing through the controller remains above the predetermined minimum or danger-point. As soon as the voltage or potential falls below this point the force of the controller is weakened and the movement of the switch under the influence of the opposing means is permitted.

It will be obvious that so far as concerns the mere opening of the switch when the voltage falls it is immaterial what form of means is employed to act upon the movable member of the switch or cut-out in opposition to the controller D, but preferably, and especially with due regard to the attainment of the objects of the invention, another electromagnetic device F of a character similar to that of the controller D is employed and in its most convenient form consists of a solenoid wound in series in the main circuit with heavy wire, so that its strength is dependent upon and its operation is determined by the amperage of the current which passes through it. As represented in Fig. 1 of the drawings, the device F is axially in line with the controller D and operates upon the common core E. It will now be understood that so long as the voltage of the batteries remains above the predetermined minimum the force of the controller D, which is suitably wound for the purpose, at least balances, if it does not exceed, the force of the oppositely-acting device F, whereby the switch or cut-out is kept closed; but as soon as the voltage falls below the predetermined minimum the strength of the controller is so far diminished as to permit the core E to be moved under the influence of the solenoid F, so as to open the switch or cut-out, the amperage of the battery meanwhile remaining substantially normal. If, however, the voltage is reduced momentarily by excessive drains on the battery, the reduction will be coincident with an increase in the amperage, which naturally would cause the movement of the core E to the right in Fig. 1, thereby opening the cut-out or switch. The operation of the cut-out under such conditions is undesirable, and the increased amperage of the solenoid F is therefore taken advantage of to operate a lock in such a manner as to prevent movement of the core and opening of the cut-out under these conditions. As shown, the lock consists of an armature G, supported in proximity to the end of the solenoid F by a suitable lever $g$, the armature being normally held back by an adjusting-spring $g'$, while the movement is limited by a stop $g^2$. The core E is provided with a non-magnetic extension E', which is formed with a notch $e'$, with which the armature or lock G engages when it is moved by the influence of the solenoid F. Another similar arrangement is shown in Fig. 2, in which the two solenoids act upon separate cores $E^2$ and $E^3$, which are connected to a switch-lever $C^2$. A lock G' coöperates with one of the cores $E^3$ in the manner already described with respect to the construction shown in Fig. 1. The two cores are acted upon by two opposing solenoids D' and F', which are series wound in the main circuit with heavy wire, the strength of the solenoid F' being greater than the strength of the solenoid D'. The strength of the solenoid F' is, however, overbalanced, so as to keep the switch or cut-out closed under normal conditions by an additional shunt-coil $D^2$ of fine wire, which also acts upon the core $E^2$, so as to overbalance the solenoid F' under normal conditions. The coil $D^2$ responds immediately to a decrease in the voltage, so that the combined strength of the coil D' and the coil $D^2$ becomes less than the strength of the coil F', thus permitting the opening of the cut-out or switch. It will be observed that the coil $D^2$ operates as a controller in the same manner as does the coil D. (Shown in Fig. 1.)

In both of the constructions previously described, as shown in Figs. 1 and 2, the electromagnetic devices act directly upon the switch-lever to move the same; but it will be readily understood that the same result can be secured by arranging the switch lever or arm to be operated by independent means, such as a spring, but subject to the control of electromagnetic devices operating in substantially the same manner as those already described. Such an arrangement is shown in Fig. 3 of the drawings, in which the switch-lever $C^3$ is acted upon by a spring $c^3$ to open the switch. A shunt-wound magnet $D^2$, when the voltage is normal, holds its armature $d$ in such a position that an arm $d'$, secured to said armature, stands in the path of the switch-lever $C^3$ and prevents its movement; but when the armature is released by the magnet the arm $d'$ moves so as to release the switch-lever and permit it to be moved by its spring. A series-wound magnet $F^2$, so long as the amperage of the current does not fall below the normal, holds its armature $f$ in such a position that an arm $f'$, projecting therefrom, stands in the path of a shoulder $d^2$ on the armature $d$ and prevents the movement of the armature, which would release the switch-lever. If the amperage and the voltage both fall below the normal, indicating permanent exhaustion of the battery, both armatures will be released, the point of arm $f'$ will drop below the shoulder $d^2$ of armature $d$, and the latter, moved by the pull of the magnet $F^2$, which then overcomes the pull of the magnet $D^2$, will disengage the arm $d'$ from the switch-lever $C^3$.

As shown in the separate figures of the drawings, the voltage, when all of the elements of the battery are in circuit, will determine the operation of the cut-out; but it is obviously possible to arrange the wiring in connection with the cut-out in such manner that there may be one such cut-out for each of the boxes or elements of the battery, or that the main circuit may be cut out when the voltage of any one box or element reaches a predetermined minimum, or that one box alone may be cut out when the voltage of that box reaches the predetermined minimum. Such arrangements of the wiring, however, are not material to the present invention.

It will be observed that the arrangements shown herein are particularly adapted for application to motor-vehicles, as they are not liable to be rendered inoperative by jolts and jars to which they would be subjected when applied to such uses. It will be understood, however, that these devices are capable of application to other uses, and other arrangements whereby a storage-battery circuit may be controlled automatically by the potential of the current will readily suggest themselves to those skilled in the art in view of the disclosure of the principles of the invention which has been made herein. The invention is not to be limited, therefore, to the particular arrangements herein shown and described.

I claim as my invention—

1. The combination with a storage-battery circuit, of a cut-out in said circuit, comprising a device operated by the amperage of the battery, and a device operated by the potential of the battery, said devices coacting to open the circuit upon a fall of the potential below a predetermined minimum while the amperage is normal.

2. The combination with a storage-battery circuit, of a cut-out in said circuit comprising an electromagnetic device operated by a decrease in potential of the battery to permit the opening of the circuit and an electromagnetic device operated by the amperage of the battery to open the circuit when permitted by the first-named device.

3. The combination with a storage-battery circuit, of a cut-out in said circuit comprising an electromagnetic device operated by a decrease in potential of the battery to permit the opening of the circuit and an electromagnetic device operated by the amperage under abnormal conditions to prevent the opening of the circuit.

4. The combination with a storage-battery circuit, of a cut-out in said circuit comprising an electromagnetic device tending to open said circuit, the operation of said device being determined by the amperage of the current passing through the same and an electromagnetic controller acting in opposition to said device, the operation of said controller being determined by the potential of the current passing through the same, whereby the circuit is opened when such potential falls below the normal.

5. The combination with a storage-battery circuit, of a cut-out in said circuit comprising an electromagnetic device operated by the amperage of the battery and tending to open said circuit, a lock operated by said device to prevent the opening of said circuit, and an electromagnetic controller acting in opposition to said device, the operation of said controller being determined by the potential of the current passing through the same.

6. The combination with a storage-battery circuit, of a cut-out in said circuit comprising two solenoids acting simultaneously in opposition, one of said solenoids being coarse-wound and tending to open said circuit and the other of said solenoids being fine-wound and tending to keep said circuit closed but permitting the other solenoid to open said circuit when the potential of the current falls.

7. The combination with a storage-battery circuit, of a cut-out in said circuit comprising two solenoids acting simultaneously in opposition upon said cut-out, one of said solenoids being coarse-wound and tending to open said circuit and the other of said solenoids being fine-wound and tending to keep said circuit closed but permitting the other solenoid to open said circuit when the potential of the current falls, and means operated by the amperage of the battery under abnormal conditions to prevent the opening of the circuit.

This specification signed and witnessed this 17th day of December, A. D. 1898.

HIRAM PERCY MAXIM.

In presence of—
FRANCIS E. FIELD,
HERMANN F. CUNTZ.